United States Patent [19]
Laethem et al.

[11] 3,877,990
[45] Apr. 15, 1975

[54] METHOD OF SLOWING ESCAPE OF CHLORINE FROM METAL-CHLORINE BATTERY

[75] Inventors: Alfred F. Laethem, Sterling Heights; Peter Carr, Utica, both of Mich.

[73] Assignee: Occidental Energy Development Company, Madison Heights, Mich.

[22] Filed: July 2, 1973

[21] Appl. No.: 375,568

[52] U.S. Cl............... 136/86 A; 136/180; 169/1 A; 252/3; 423/241
[51] Int. Cl...................... H01m 29/04; H01m 1/08
[58] Field of Search.......... 136/180, 179, 86; 252/3, 252/90; 169/1 A, 2 A; 423/241

[56] References Cited
UNITED STATES PATENTS

| | | | |
|---|---|---|---|
| 1,198,419 | 9/1916 | Clark | 136/180 |
| 1,578,850 | 3/1926 | Rosenstein | 423/241 |
| 2,165,997 | 7/1939 | Damier et al. | 252/3 |
| 2,699,216 | 1/1955 | Allen | 169/1 A |
| 2,949,426 | 8/1960 | Thiegs | 252/3 X |
| 3,713,888 | 1/1973 | Symons | 136/6 R |
| 3,738,428 | 6/1973 | Ingro | 169/2 A |

FOREIGN PATENTS OR APPLICATIONS

| | | | |
|---|---|---|---|
| 28,518 | 12/1912 | United Kingdom | 423/241 |

*Primary Examiner*—Allen B. Curtis
*Attorney, Agent, or Firm*—B. F. Claeboe; B. E. Hosmer

[57] ABSTRACT

The escape of chlorine from a source thereof, such as the chlorine hydrate store of a metal-chlorine battery, is prevented or further escape and circulation of chlorine is slowed by blanketing escaped chlorine and the source thereof with a foam, such as one which is generated from an aqueous system which includes a foaming agent, e.g., an anionic surface active compound, and a gas. In preferred embodiments of the invention, neutralizing agents are present in the foam to convert the chlorine to a less toxic state or condition. Also described are pressurized compositions for generating the foam, articles for containing and dispensing the compositions and apparatuses for applying the compositions to sources of escaping chlorine, some of which apparatuses operate automatically when chlorine accidentally escapes from the battery. Also described is an apparatus for confining the escaped chlorine near the source thereof, in case of a motor vehicle accident, and contacting such chlorine with a neutralizing medium.

5 Claims, 3 Drawing Figures

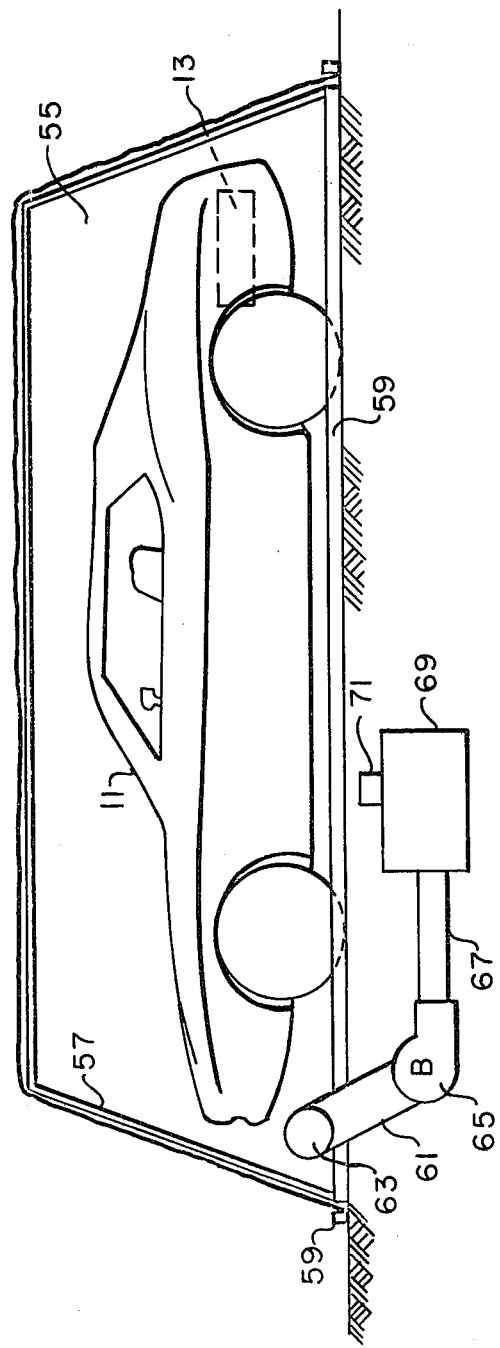

METHOD OF SLOWING ESCAPE OF CHLORINE FROM METAL-CHLORINE BATTERY

BACKGROUND OF THE INVENTION

High energy density batteries have been employed to power electric motor drives for automobiles and other motor vehicles. They possess significant advantages over conventional power plants, such as internal combustion engines, because they emit no exhaust gases and hence, do not pollute the air. Among such high energy density batteries, hereafter referred to as HED batteries, one which has proven successful in practical use tests utilizes a combination of metal and chlorine electrodes. In such batteries the metal is preferably zinc and the chlorine electrode is produced by passing electrolyte containing dissolved chlorine (some of it may also be entrained) through openings or pores in a graphite electrode substrate. Chlorine is consumed in the operation of the battery and is preferably replaced in circulating electrolyte by controlled decomposition of a source of chlorine hydrate. Such operation has been disclosed in U.S. Pat. No. 3,713,888. Other metals besides zinc have been described therein.

Chlorine hydrate ($Cl_2 \cdot 6H_2O$) is a stable solid at temperatures up to 5°C., and usually is held at temperatures in the range of −20° to +5°C., preferably −5° to 5°C., when it is stored for use as a source of chlorine. Its critical temperature is about 9°C. and, therefore, to cause liberation of chlorine from chlorine hydrate, it is only needed to raise the temperature of the hydrate to that at which chlorine will be released. By definition, if the temperature is raised above the critical point, hydrate will decompose, yielding chlorine gas and water. In preferred HED battery systems, the electrolyte which circulates through the battery cells is employed as a means for heating at least some of the chlorine hydrate in the store thereof when the battery is discharging and it is desired that chlorine gas should be produced to rejuvenate the electrolyte. Electrolyte leaving the HED battery is usually at a temperature above ambient, due to heating effects in the battery cells, making it especially effective for use to release chlorine from chlorine hydrate in the hydrate store. Contact of the electrolyte with the hydrate may be direct or indirect and various mechanisms may be employed for controlling such contact and controlling the amount of chlorine released from the hydrate and the concentration of chlorine gas, entrained or dissolved, in the circulating electrolyte.

Although the HED chlorine-metal electrode batteries do not normally emit any pollutants, in the event of a collision or other accident involving the motor vehicle which could adversely affect the integrity of the system, chlorine could be released. Especially because the chlorine hydrate store includes most of the chlorine which could be accidentally released to the atmosphere and could be harmful to persons at the scene of the accident, it is important that release of chlorine from the hydrate store (and from the total HED battery system) be prevented insofar as possible. However, in cases where, despite efforts made to prevent the escape of chlorine when an accident occurs, there is such an escape, the present invention is useful to minimize undesirable effects. Of course, it is contemplated that the present invention will be utilized in conjunction with other means and mechanisms for minimizing chlorine release and the effects thereof due to accident.

SUMMARY OF THE INVENTION

In accordance with the present invention, a method of preventing the escape of chlorine from a source thereof or slowing further escape and circulation of the chlorine comprises blanketing a volume of escaped chlorine and the source thereof with a foam. Preferably, the foam is one which includes a gas such as nitrogen, air or carbon dioxide or a liquifiable gas, such as a halogenated hydrocarbon, and a foaming agent, usually a synthetic organic surface active compound of the sulfuric reaction type, preferably applied with a neutralizing agent to convert the chlorine to a less toxic state or condition. The foam is preferably applied to the volume of escaped chlorine and the hydrate store or other source from which the chlorine is escaping from the HED battery system of a motor vehicle. Also within the invention are compositions for producing the foams, pressurized dispensers containing such compositions and apparatuses for discharging the foam onto a HED battery system element or elements, preferably automatically in response to conditions indicative of a collision or other emergency involving the motor vehicle which is powered by the HED battery.

An additional apparatus for confining and neutralizing the chlorine which may be issuing from a demolished vehicle includes a confining cover for the vehicle and neutralizing agent on the cover or in communication with confined chlorine, so that the chlorine is detoxified by it and circulation of the chlorine before neutralization is inhibited. In a preferred form of such apparatus and corresponding method, they are employed in conjunction with the described foam and the chlorine confined by the cover or tent-like structure is blown or otherwise conveyed to a contractor where it is brought into good contact with neutralizing medium and is reacted with, dissolved in or absorbed by such medium.

DESCRIPTION OF PREFERRED EMBODIMENTS

Figure 1:
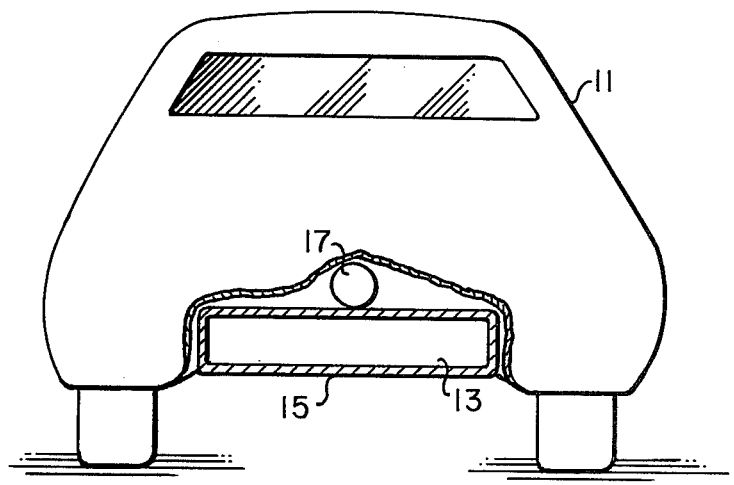
Figure 2:
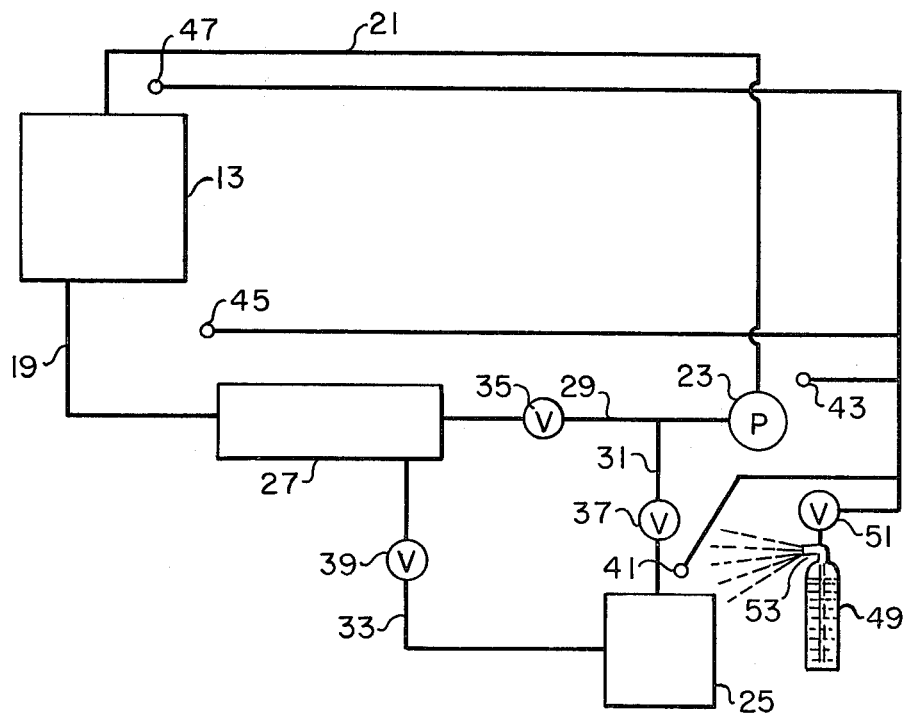

The present invention and its mode of operation will be apparent from the following description, taken in conjunction with the accompanying drawing in which:

FIG. 1 is a partial sectional elevation of the rear of a motor vehicle including a HED battery system mounted thereon;

FIG. 2 is a schematic top plan of a HED battery system, illustrating circulation of electrolyte through the system, feeding of chlorine from a chlorine hydrate store to recirculating electrolyte, and dispensing of pressurized foam onto the chlorine hydrate store to confine and neutralize accidentally released chlorine exiting from the system at any of various parts thereof; and FIG. 3 is a side elevation of a motor vehicle including a HED battery system mounted thereon, from which chlorine escaping after an accident is confined by a cover member and is neutralized with treating chemicals.

In FIG. 1 there is illustrated a rear view of an automobile 11 with a portion thereof cut away, showing mounting of a HED battery 13, of the metal-chlorine electrodes type, in a supporting framework 15. Not illustrated in the figure are various connections of the battery to other elements of the HED battery system, such as a circulating pump, chlorine store, dissolver and control mechanisms. Such may be located forward of or on top of the battery and in a more extensive modification of the present design, behind it, with the battery being moved forward in the vehicle. A pressurized container 17 of the aerosol type is mounted on top of the HED battery system so that a foam, preferably a neutralizing foam, created by the discharge of the contents from the container as a discharge valve thereof is opened, covers all of the HED battery system in a most preferred embodiment of the invention, or covers at least the hydrate store portion thereof, more preferably such portion together with other potentially leaking elements or sections of the system. The valve of pressurized container 17 may be actuated for release of the contents and production of the foam by automatic means, responsive to excess chlorine in the vicinity, or collision- or breakage-responsive means, or may be operated by mechanical or other remote control means actuatable from the driver's seat or compartment and preferably actuatable by either the driver or the front seat passenger. Because such means for remote valve actuation are conventional such is not illustrated in detail in the present drawing.

FIG. 2 shows the various elements of the HED battery system, including the electrolyte compartment 13 having a battery of cells, electrolyte inlet and outlet lines 19 and 21, pump 23, chlorine hydrate store 25, absorber or dissolver 27, connecting lines 29, 31 and 33, electrolyte flow control valves 35, 37 and 39, detecting probes 41, 43, 45 and 47, pressurized container of foam generating composition 49, dispensing valve 51 and valve spout 53. In operation, the chlorine electrodes of the electrolyte compartment 13 are maintained rejuvenated by circulating electrolyte supplied with chlorine from chlorine hydrate store 25. Thus, during discharge of the HED battery chlorine is consumed and the chlorine-poor electrolyte exiting from the electrode compartment 13 through line 21, which is at an elevated temperature, is pumped by pump 23 in a recycle path, along line 29, through valve 35 and dissolver 27 and back through inlet line 19 to the electrode compartment. A proportion of the circulating electrolyte passes through chlorine store 25 and the heat of the electrolyte, either directly or indirectly, causes the release of chlorine from some of the hydrate, the chlorine and water released being returned to the battery through line 33, valve 39, dissolver 27 and inlet 19. The proportion of flow of electrolyte through the chlorine supply 25 is regulated by adjustment of valves 35, 37 and 39 or may be automatically controlled, usually in response to the dissolved and entrained chlorine gas content of the circulating electrolyte by any of various means employed for this purpose, some of which are the subjects of other patent applications filed by inventors working for the present assignee company.

In the event of ruptures in any of the lines and especially in the event of a leak or break in the wall of the chlorine hydrate store, large quantities of chlorine could be emitted from such system. Especially after a collision, which might well inactivate the battery, chlorine released from the hydrate store, even if circulated through a portion of the system, would not be converted to chloride in the battery and the chlorine gas concentration would build-up. Under such conditions, discharge of the gas could create a hazard to persons in the vicinity of the vehicle involved. Accordingly, although other methods may also be employed to minimize the hazard and to prevent generation and discharge of chlorine from the HED battery system for those situations when chlorine is released from the system, provision is made to contain it and preferably to detoxify it and the various system parts, in accord with the present invention.

In FIG. 2, the various parts of the HED battery system are shown schematically and for purpose of illustration they are separated, but in actual practice, so as to fit into the space available in a motor vehicle, they will be much more compactly located. Thus, discharge of a foam from pressure vessel 49 or from a small plurality of such vessels, e.g., 2–4, will enable the entire system or substantially all of it to be covered by the foam. In a similar vein, although the drawing illustrates four probes or sensors to detect overconcentrations of chlorine and to actuate dispensing valve 51 upon such detection, it may be possible to utilize only a single probe or a lesser number than the four shown. However, for greatest safety, one probe will be located at each of the more probable areas of failure and chlorine release in the event of collision. The probes may operate on chemical, optical-chemical, conductivity or other principles to detect the content of chlorine and upon detection of an excess thereof; it is preferred that electrical signals be sent from the sites of the probes or the situs of a particular probe to valve 51, which will be electromagnetically (solenoid) actuated. Valve 51 may be such as will dispense the entire contents of vessel 49 upon actuation or may be returnable to closed position upon indication by the electrical signal from the probe that the chlorine content has diminished. A mechanically actuated dispensing valve may be employed too, as with a spring loaded valve in which the spring tries to open it, but it is held shut by a catch which is released by breakage of a magnesium strip when it is attacked by chlorine.

Although various foam compositions may be employed in carrying out the methods of the present invention, including those based on organic gums, e.g., gelatin, carageenan, alginates and sodium carboxymethyl cellulose; synthetic organic plastics, e.g. foamed polyurethanes, polystyrene foams and polyethylene foams; and inorganic gelling agents, e.g., clays, bentonite, silica gels and fumed silicas, it will usually be preferable to employ aqueous compositions based on a synthetic anionic organic surface active agent or a mixture of such agents, as the foaming material. These are described at length in Detergents and Emulsifiers 1969 Annual by McCutcheon and in Surface Active Agents and Detergents by Schwartz, Perry and Berch, (Interscience Publishers, 1958). Of the surface active agents, it is often highly preferable to utilize the sulfuric reaction products and of these those which also have good detersive properties appear to be most satisfactory. Generally, such compounds include the water soluble salts of sulfuric and sulfonic acids having lipophilic moieties. Such lipophilic moieties normally are higher alkyls, preferably linear alkyls, of 10 to 20 carbon atoms, higher fatty acyls of similar chain lengths and middle and higher alkyl phenyls wherein the alkyl is of 8 to 20 carbon atoms. Also useful are the sulfated or sulfonated lower-alkoxylated alkanols, phenols and alkylphenols. The water soluble higher fatty acid soaps are considered to be within the description of synthetic organic surface active agents and detergents. The salt-forming cations for the detergent-salts may be alkali metal, where sodium is preferred, but potassium may also be used. In some cases, a small quantity of alkaline earth metal or magnesium detergent salt may be present.

Exemplary of suitable foaming agents are sodium linear higher alkyl benzene sulfonate wherein the higher alkyl is of 12 to 15 carbon atoms, e.g., tridecyl; disodium didecyl sulfo-succinate, potassium coconut oil fatty acids monoglyceride sulfate; sodium paraffin sulfonate; sodium isooctylphenoxy polyethoxy ethanol wherein the polyethoxy is of 9 ethoxies; sodium coco-tallow (20: 80) soap; and potassium N-lauroyl sarcoside. Also useful are the more surface active and less detersive compounds corresponding to the mentioned detergents wherein instead of the higher lipophilic group on the benzene ring, there is present a methyl or ethyl group, two such groups or no substituent. Such materials may be mixed with the mentioned detergents and mixtures of detergents too, may be employed. Foam stabilizers may be present. These may also be employed in known proportions, usually at from 10% to 50% of the surface active agent content.

With the surface active agent, which aids in the production of foam by holding fine gas bubbles in thin films of liquid, there is usually present an aqueous medium, preferably water and frequently this will be a major proportion of the composition. Although pressure may be developed in dispenser 49 by mechanical means and air or other gas may be mechanically or physically entrained in the surface active solution being sprayed onto the hydrate store to create a foam, it is often preferable that a pressurized gas or liquified gas of the halogenated hydrocarbon type be utilized for this purpose. Such gas aids in dispensing of the foam compositions from the container and produces the gas phase of the foam. In the case of nitrogen or carbon dioxide, pressurized gases or the halogenated hydrocarbons, especially those in which the halogen is a mixture of chlorine and fluorine and the hydrocarbon is of 1 to 4 carbon atoms, the propellant and foaming gas is non-flammable and, in the event, that there is any danger of fire caused by the collision, the foam will help to prevent it or extinguish any small flames that might have been started. For this reason, it is generally not as desirable to employ the lower hydrocarbon propellants, e.g., propane, isobutane, and mixtures thereof, but such materials are operative and useful when there is no danger of fire. Among the satisfactory propellants are those known as Propellants 11, 12, 21, 22 and 114 and mixtures thereof. Such propellants are monofluorotrichloromethane; dichlorodifluoromethane; monofluorodichloromethane; monochlorodifluoromethane; and symmetrical dichlorotetrafluoroethane.

Instead of an aqueous medium containing organic propellant emulsified in the aqueous phase with the aid of the foaming agent a pressurized gas may be employed, part of which is dissolved and the remainder of which is in a separate section of the pressurized container. With the latter type of compositions, it is often better to use a break-up or aspirating dispensing nozzle which draws in outside air to help form the foam. In the former case, the lipophilic liquified gas propellant vaporizes to furnish the gaseous phase of the foam. In another embodiment of the compositions, the content of gum in the pressurized product is higher and the propellant is comparatively slowly released so that a gel is discharged, which expands to a foam.

While the foam itself performs a very useful function in confining the chlorine and limiting or preventing circulation of it, it is often additionally desirable for it and the pressurized composition to contain a neutralizing agent to counteract the effects of the chlorine and to detoxify it when feasible. Although various materials may be employed, soluble or insoluble in the liquid medium to be dispensed, the most effective of these are the alkali metal and alkaline earth metal carbonates, oxides, bicarbonates and hydroxides and reactive, finely divided metal powders, such as magnesium, aluminum and zinc. Of the two groups of materials, the salts are preferred, because they dissolve to some extent in the aqueous phase and create fewer valve blocking problems. The carbonates, bicarbonates and sesquicarbonates also liberate carbon dioxide gas, when they react with chlorine, and it is useful in extinguishing any fires or in helping to prevent fires originating in a vehicle involved in an accident, usually caused by an electrical short circuit. The salts and hydroxides may be present in finely divided powdered form, as may be the metal powders. Preferred salts are sodium carbonate, sodium bicarbonate, calcium hydroxide and calcium carbonate. Particle sizes for the powdered salts and metals are as small as feasible, usually being from 0.1 to 100 microns, but in some cases, particles as large as a millimeter (where valve design is suitable) may be used.

The neutralizing materials employed may be sorbents for the chlorine, either absorbents or adsorbents, so that instead of converting it to chlorides or to chlorides and hypochlorites the chlorine is merely physically held to a very finely divided material. Some of the actions of the inorganic salts and metal powders may be of this type, but it is also contemplated that within the "neutralizing" agents of the invention there should be included those very finely divided powders, such as fumed silicas, clays, diatomaceous earths and celluloses, which entrap the chlorine physically rather than change it chemically.

Some of the materials previously mentioned as being capable of producing some types of foams, e.g., the organic and inorganic gums and thickening agents, including those previously mentioned, hydroxyethyl propyl cellulose, polyvinyl alcohol, carob bean gum, synthetic calcium aluminum silicates and calcium magnesium silicates, when finely divided, exert thickening effects on surface active foams produced, such as those previously described as being in accordance with this invention. Such materials possess other beneficial properties, including that of helping to maintain suspended the finely divided particulate materials utilized in the pressurized foaming composition for neutralizing chlorine. Thus, these adjuvants will often be present with the normal constituents of the present compositions, the surface active agents, aqueous media, pressurizing means and neutralizing agents. In some compositions used in accordance with the present invention the neutralizing and suspending agents may be omitted and in some cases, as where a foam is mechanically generated, the liquified or pressurizing gas and the pressurized container are not needed.

The proportions of materials for manufacturing the pressurized compositions may be varied over comparatively wide ranges so long as a desired foam of sufficient stability is produced which confines and preferably, detoxifies the chlorine. Normally, however, the compositions will be aqueous and will contain from 30 to 80% of water, preferably from 40 to 70% thereof; 5 to 30% of liquified gas or 0.5% to 5% of pressurized gas propellant; 0.5 to 20%, preferably 1 to 10% of surface active agent, preferably of the sulfuric reaction salt type; 5 to 50%, preferably from 10 to 35% of chlorine neutralizing agent and 0.1 to 5%, preferably from 0.5 to 3% of suspending agent. The pressure of the system will usually be within the range of 20 to 300 lbs./sq. in., and preferably will be from 40 to 100 lbs./sq. in.

The compositions described and the valved dispenser containing them may be employed in the foam discharging article of the apparatus of FIG'S. 1 and 2, previously discussed. In such operation, discharge of the foam from the container will blanket the accidentally released chlorine and a portion of the HED battery system, preferably the hydrate store thereof, and will prevent or slow further escape of chlorine. During the blanketing step, chlorine will react with neutralizing components of the foam. The purpose of the foam is to maintain one atmosphere of pressure over the chlorine hydrate, thereby decreasing the rate of decomposition of the hydrate. In addition, if the foam is white in color, it will reflect sunlight further preventing hydrate decomposition and insulating the hydrate.

When the foam is not dispensed from a pressurized container it may be created by conventional means, such as are also suitable for production of fire fighting foams. In such instances an aqueous solution of the foaming agent may be mechanically agitated, as by mixing nozzles, spraying through a screen, aspirators, etc., to produce a foam. In such operations, neutralizing agents, thickeners or suspending agents, foam stabilizers and various other adjuvants may be employed, usually being added just before the mixing valve or the foaming operation is effected. Sometimes, one directs the solution of foaming agent or of chemicals capable of producing a foam onto the chlorine source or the hydrate store and then the chlorine being emitted, air or other gas may be mechanically entrapped in the liquid to form the desired foam. In such cases, the neutralizing agent is usually dispersed or dissolved in the foaming agent solution before spraying onto the chlorine situs.

The following examples illustrate, but do not limit the invention. Unless otherwise indicated, all parts are by weight and all temperatures are in °C.

EXAMPLE 1

A pressurized foaming "aerosol" composition is prepared by admixing 60 parts of water, 5 parts of sodium lauryl benzene sulfonate, 2 parts of potassium stearyl alcohol sulfate, 20 parts of finely divided (100 microns or less) particulate sodium carbonate and 3 parts of sodium carboxymethyl cellulose. Initially, the surface active agents are dissolved in 30 parts of the water and the sodium carbonate is added to the resulting solution, with as much sodium carbonate being dissolved as possible. The rest of the water is warmed to 50°C. and the organic gum is dissolved in it, after which the gum solution is admixed with the surfactant-carbonate solution. Five kilograms of the mixture are then added to a pressure-retaining dispensing container through an opening therein, which is then sealed. Subsequently, a 50:50 mixture of Propellants 11 and 12 is added through the dispensing valve of such container until 13 parts thereof are in the container. A suitable foaming spout for the valve is attached and the dispenser and contents are allowed to attain room temperature, 25°C. The pressure in the container at such temperature is about 50 lbs./sq. in.

In a test operation of the safety system, the dispenser is installed in an HED metal-chlorine electrodes battery system. Chlorine is released from various leakage points in the system, actuating magnesium strip chlorine detecting mechanisms and causing the electromagnetic opening of the dispensing valve of the pressured container. The container is located so that foam dispensed when the valve is opened is directed primarily at the chlorine hydrate store, but also covers the other elements of the HED battery system. The system is covered with a six inch layer of foam which limits the escape of chlorine.

EXAMPLE 2

Instead of utilizing a pressurized dispenser, the method of the invention is practiced by employing a fire-fighting foaming nozzle and feeding it a mixture of sodium lauryl alcohol sulfate and potassium xylene sulfonate (3:1 ratio), with the total proportion of surface active agent:water being about 1:40. Finely powdered sodium carbonate, preferably in hydrated form, is mixed with the water stream to act as a neutralizing agent for the chlorine. Use of foam stabilizers and thickeners is optional. A foam is produced, which when directed on a chlorine hydrate store of a HED battery system from which chlorine is escaping, helps to maintain the temperature of the store low, insulating it from external heat, especially on warm days when the temperature is over 30°C., and helping to contain the emitted chlorine. In a modification of this experiment, the mixture of water, neutralizing agent and surfactant is directed onto the HED battery system and the hydrate store without pre-foaming. Foam is produced by the emitted and entrained gas, but the application is not as satisfactory, as when a foaming nozzle is employed.

EXAMPLE 3

In a variation of the procedure described in Example 1, instead of having the pressurized foam dispensed automatically when the concentration of chlorine near the HED battery system is too high, it is discharged by action of the vehicle operator pressing a button to open the valve electromagnetically or pulling a ring mechanically connected with the valve. In such operation, by releasing the button or ring the valve may be closed, preventing complete exhaustion of the foaming composition from the container, if only a small quantity is needed to limit escape or circulation of the chlorine, until the arrival of a repair vehicle equipped with special refrigerating apparatus, etc., to cool the hydrate during inoperativeness of its cooler, etc.

To supplement the action of the described apparatuses, products and methods, on those occasions when some chlorine may escape despite the presence of the foam, the apparatus illustrated in FIG. 3 is useful. Also, such apparatus may be employed when the HED battery system is not protected by a foam releasing system. As illustrated in FIG. 3, automobile 11, equipped with HED metal-chlorine electrode battery 13 from which chlorine is accidentally escaping, is covered by a suitable plastic, e.g., clear 6 mil polyethylene sheet, or canvas tent-like structure 55, supported poles or framework 57 and held against the ground by weights or sills 59 of the tent frame. The structure limits the circulation of chlorine and restricts it to the vicinity of the vehicle. To remove the chlorine from the system, there is provided a connection 61, joined to the tent at opening 63 and communicating with a blower 65 which sends the chlorine through inlet 67 to neutralizer 69. The neutralizer contains powdered, dissolved or moistened neutralizing agents, such as those previously described, e.g., sodium carbonate, sodium hydroxide, calcium carbonate or calcium hydroxide, lime and reactive metals that form chloride when contacted with chlorine gas. Any air or carbon dioxide by-product entrained with the chlorine entering the absorber or neutralizer 69 may be vented through line 71.

In operation, utilizing a 20% aqueous solution-suspension of sodium carbonate and blowing chlorine through the neutralizer at the rate of about 30 cubic feet per minute, together with an equal volume of air, essentially all the chlorine is neutralized during the first 10 minutes of operation, when the neutralizer is of a ten gallon size and is full of moistened sodium carbonate. During blowing of the chlorine to the neutralizer, the rate of removal from the tent volume is held equal to that of chlorine escape from the battery system to keep the tent "inflated" to a constant extent, preventing rupture or collapse.

The invention has been described with respect to specific illustrations and preferred embodiments, but is not to be limited to these, because those of skill in the art will be able to employ substitutes and equivalents without departing from the spirit or scope of the invention. For example, although the primary use of the invention is with respect to protecting the occupants of a motor vehicle from which chlorine is being accidentally emitted, it is evident that various of the methods, compositions and apparatuses of the invention will be applicable to stationary HED battery systems and other apparatuses from which chlorine might escape.

What is claimed is:

1. A method of slowing the escape of chlorine from a metal-chlorine battery system, containing chlorine hydrate, of a motor vehicle which comprises blanketing said chlorine and its source with a foam, comprising an aqueous medium and a chlorine neutralizing agent to chemically convert the chlorine to a less toxic state or condition, released from a pressure-resistant dispensing container.

2. A method according to claim 1, wherein the foaming agent is a synthetic anionic organic surface active agent of the sulfuric reaction type and a chlorine neutralizing agent which converts the chlorine to a less toxic state or condition is applied to the hydrate and is a component of the foam.

3. A method according to claim 2, wherein the chlorine neutralizing agent is selected from the group consisting of alkali metal and alkaline earth metal carbonates, bicarbonates, oxides, and hydroxides and finely divided powders selected from the group consisting of aluminum, zinc, magnesium, and mixtures thereof.

4. A method according to claim 1, wherein the foam is produced before application to the hydrate store by aerating a solution of foaming agent and entraining with it a chlorine neutralizing agent which converts chlorine to a less toxic state or condition.

5. A method according to claim 4, wherein the foaming agent is a synthetic anionic organic surface active agent of the sulfuric reaction type and the chlorine neutralizing agent is selected from the group consisting of alkali metal and alkaline earth metal carbonates, bicarbonates, oxides, and hydroxides and finely divided powders selected from the group consisting of aluminum, magnesium and zinc, and mixtures thereof.

* * * * *